Patented Feb. 1, 1949

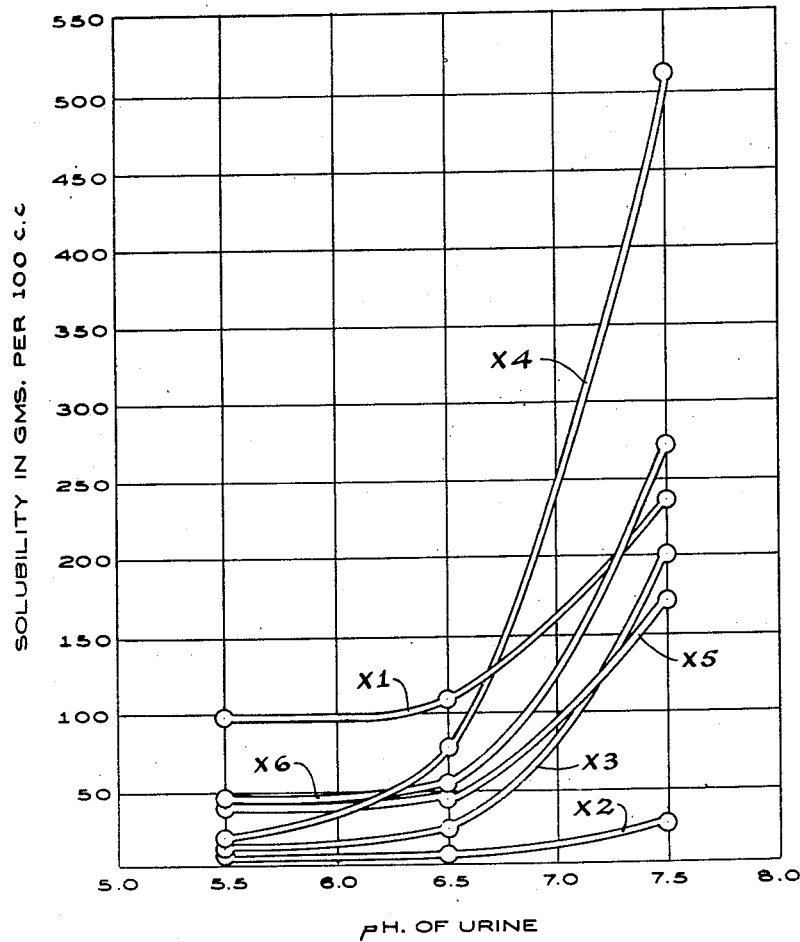

2,460,437

UNITED STATES PATENT OFFICE 2,460,437

SULFA DRUG COMPOSITIONS

Marvin Russell Thompson, Riverside, Conn.

Application February 17, 1948, Serial No. 8,837

6 Claims. (Cl. 167—51.5)

The present invention relates to a therapeutic preparation for improving the action and safety of sulfa drugs.

Administration of the ordinary sulfa drugs is always attended by the likelihood or renal complications caused by the limited solubility of such drugs the urine created in part by the drug itself. Renal complications caused by sulfonamides have often terminated in death.

In the effort to overcome danger of renal complication, it has been the practice to prescribe bicarbonate in tablet form to be taken in conjunction with the sulfa medication in order to maintain the urine on the alkaline side, which favors solubility and elimination of the excreted drug.

This more or less haphazard intake of alkali fails to account for idiosyncrasy in the ability of individuals to excrete alkali through the kidneys. For example, where kidney action is below normal, the low rate of excretion may cause alkalosis in some individuals, while an overly fast rate in others depletes the alkali reserve causing renal complications which often prove fatal. Also, where the drug is given over an extended period, the efficiency of the kidney in excreting alkali increases causing the rapid elimination of the alkali and resulting in renal precipitation and stoppage.

The administration of sufficient alkali to, in all cases, inhibit renal precipitation has inevitably been tempered by restraint due to the danger of alkalosis through overalkalization of the system. Various alkalis, including lactates, have been mentioned as substitutes for bicarbonate but in amounts restricted to the alkali equivalent of the bicarbonate given in any case.

It is primarily the object of the present invention to improve the administration of sulfa drugs by eliminating under all conditions the danger of renal precipitation and accomplishing this objective without untoward reaction in the patient.

I have found that the aforementioned difficulties may be eliminated and sulfa drugs administered in an oral mixture of a sulfa drug such as sulfadiazine, sulfathiazole, sulfamerazine and sulfamethazine with a lactate salt in which the amount of the lactate salt is approximately 3 times the amount of the sulfa drug. The sulfa drug in finely divided state is preferably suspended in the lactate salt while in the form of a liquid solution. The mixture of sulfa drug with the lactate forms a palatable preparation and masks the normally bitter taste characterizing sulfa compounds. Because of its pleasing flavor the composition is especially suitable for children and individuals usually afflicted by nausea and gastric disturbances on receiving sulfa compounds.

In concentrated mixtures of lactate and sulfa drug there is a strong tendency for the sulfa drug to react with and form side reaction products of a toxic nature substantially reducing the potency of the composition. It has been found that the composition may be treated in such a way as to stabilize the preparation preserving the full potency of the sulfa drug for an indefinite period and eliminating the formation of toxic products. Concentrated lactate salt and especially sodium lactate has a substantially alkaline pH. I have discovered that by reducing the pH of the lactate to below the neutral point or preferably to within the range of from a pH of 6.0 to 7.0, the tendency of the sulfa drug to decompose is entirely eliminated. This enables the drug and lactate salt to be given as a mixture in concentrations which assure the strength of the sulfa drug and adequate potential alkali in the form of the salt. It is preferred to add sufficient lactic acid to the lactate to reduce the pH to about the neutral point of 7.0 and then incorporate the sulfa drug such as sulfadiazine in the proportion of 1 part of sulfadiazine to about 3 parts of sodium lactate or the lactic acid added to a liquid mixture of the sulfonamide and lactate. Other acids may be used but lactic acid is preferred since it is readily assimilated.

The exact action of the lactate and sulfa drug mixture after it enters the system is not entirely known nor is any theory of action essential to the invention, but the following may be set forth to illustrate the broad conception of my invention and the scientific teachings appurtenant thereto.

The administration of ordinary alkalis appears to cause a sudden increase in the amount of functioning alkali in the system which is rapidly excreted into the urine. The elimination of the drug is apparently at a slower rate so that drug may continue to be excreted after the alkali supply in the system has become exhausted, resuling ultimately in precipitation and other renal complications.

Systematically, lactates released through muscle activity are automatically converted to carbonate and bicarbonate to maintain a slightly alkaline condition in the blood and any excess lactate over that required is converted to glycogen or animal carbohydrate. When additional lactate is added to the system by administration of the present composition the surplus is apparently converted by metabolic processes into carbonate and bicarbonate as needed until the pH of the system reaches a maximum of about 7.5, whereupon further conversion of the lactate ceases. In prolonged administration, the sulfonamide and the infections requiring sulfonamide therapy tend to increase the acidity of the urine which normally averages around 5.5 to 6.0 wherein the solubility of the sulfa drug is a minimum causing the drug to precipitate and resulting in renal complication. It has been found, however, that when lactate is given in a mixture with the sulfonamide in proportions of 3 to 1 in repeated dosage a sufficient amount of the lactate, above that normally present, is apparently stored in the system so that continuous excretion of sufficient bicarbonate by the kidneys occurs during the active period of the related amount of the sulfonamide drug to prevent renal complication until the drug is entirely eliminated from the system.

As shown in the accompanying graph, a direct relationship exists between the pH of the urine and the solubility of the sulfa drug at any concentration, i. e. relatively smaller amounts of the sulfa drug are soluble at a lower pH value than larger amounts of the same drug. It has acid to reduce the pH of the composition below an alkaline range.

Example 1.—The pH of 300 gms. of a 50 percent sodium lactate solution was first reduced to approximately neutrality or slightly below by the addition of lactic acid. 50 gms. of microcrystalline sulfadiazine were suspended in the neutralized sodium lactate liquid with agitation. The pH was then readjusted to neutrality and appropriate flavorings added.

Example 2.—50 gms. of microcrystalline sulfathiazole were mixed with 300 gms. of 50 percent liquid sodium lactate prepared as in the preceding example, with agitation.

Example 3.—50 gms. of a mixture of equal parts microcrystalline sulfamerazine and sulfadiazine were mixed with 300 gms. of 50 percent liquid potassium lactate solution prepared in the manner of Example 1.

An ordinary teaspoonful dosage of the sulfonamide preparation may contain about 0.5 gm. sulfonamide to about 1.5 gm. of the lactate salt.

Example 4.—50 gms. of a mixture of sulfadiazine, sulfathiazole, sulfamerazine and sulfamethazine were mixed with 300 gms. of 50 percent sodium or potassium lactate or mixtures thereof in any desired proportions.

The following experiment illustrates the effectiveness of the preparation:

| No. of Patients | Dosage | Sulfadiazine Blood Levels | Urine Reaction | Renal Precipitation | Sulfadiazine Crystals | Hematuria | Alkalosis |
|---|---|---|---|---|---|---|---|
| 43 | Equiv. to 0.1 gm. Sulfadiazine per Kg. during 24 hrs. | All satisfactory | All neutral to slightly alkaline. | None | None | None | None. | been found that with the present concentrations of 3 to 1 of the lactate and sulfonamide the urine acidity is offset sufficiently to insure solution of the sulfonamide throughout the period of excretion irrespective of the size or frequency of dosage. Also, since the constituents are stabilized as a liquid mixture the relationship remains fixed regardless of dosage.

Moreover, when the lactate is given in the indicated relationship to the sulfa drug or in even greater amounts, overalkalization or alkalosis does not occur since the system ceases to convert lactate into alkali metabolically when the pH reaches a maximum of about 7.5. Amounts of the lactate up to 5 to 1 or more may be given without evidence of alkalosis. Thus, even where kidney action is below normal, excess alkali does not build up in the system as in the case of other alkalis such as bicarbonates even though substantial amounts of the mixture may be administered. The lactate is apparently stored as such or in the form of glycogen and gradually converted to assure solution and elimination of the related amount of sulfa drug.

Smaller amounts of lactate relative to the sulfa drug do not produce a sufficient or constant barrier to renal complications since, as in the case of ordinary alkalis, the potential alkali in the form of lactate is depleted while drug excretion continues.

To form the composition of the present invention 1 part of finely pulverized microcrystalline sulfa drug is suspended in a liquid containing 3 parts by weight of a lactate salt at a concentration of preferably about 50 percent, which solution is treated with an acid to bring the pH preferably to within the range of from 6.0 to 7.0. Alternatively the sulfa drug may be added to a solution of a lactate salt containing sufficient The dosages were administered in the manner indicated without harmful results as set forth above.

When given orally in teaspoonful dosages over a period of 3 to 5 days at 4 hour intervals, the composition resulted in a constant elevation of pH in the urine so that solution of the excreted sulfa drug is assured under all conditions. This is due to the fact that with concentrations of at least 3 parts of the lactate to 1 part of the sulfa drug, the pH of the urine is sufficiently elevated to cause adequate sulfonamide solubility to prevent renal complications regardless of dosage.

When dosages of the composition of the invention are increased, the amount of lactate administered is automatically increased. This is distinguished from the administration of bicarbonate, the amount of which must be carefully increased when any increase in dosage of sulfa drug is indicated. In the latter case the alkalizing effect of sodium bicarbonate does not parallel sulfonamide blood levels, i. e. unfortunately there is no way of insuring that the bicarbonate is present at the time it is most critically needed.

The combination of the present invention provides for a notably increased absorption rate and more rapid and higher blood levels. This obviously provides for greater effectiveness and less waste. The invention is applicable to sulfonamide drugs having solubility characteristics which are influenced by pH changes within the physiological range.

By virtue of the invention, the palatability of the sulfa drug is greatly enhanced and the necessity for prescribing and regulating adjuvant alkali medication is eliminated.

Various changes and modifications in the composition and method set forth herein may be made without departing from the spirit and scope of the invention. The present application is a continuation in part of Serial No. 751,362, filed May 29, 1947, now abandoned.

I claim:

1. An orally administrable therapeutic composition for producing effective blood levels of a sulfa drug without renal complications or alkalosis comprising a suspension of a sulfa drug in a liquid containing a lactate salt selected from the group consisting of sodium and potassium lactates in an amount at least three times the amount of the drug, and sufficient acid to reduce the pH of the liquid composition to slightly below the alkaline pH range to stabilize the drug and to enable the drug and lactate salt to be given as a mixture.

2. The composition of claim 1 wherein the sulfa drug named is sulfadiazine.

3. The composition of claim 1 wherein the sulfa drug named is sulfamerazine.

4. The composition of claim 1 wherein the sulfa drug named is a mixture of sulfadiazine and sulfamerazine.

5. The composition of claim 1 wherein the lactate salt constitutes about 50% of the liquid.

6. An orally administrable therapeutic composition for producing effective blood levels of a sulfa drug without renal complications or alkalosis comprising a suspension of a sulfa drug in a liquid containing a lactate salt selected from the group consisting of sodium and potassium lactates in an amount at least three times the amount of the drug and a sufficient amount of free lactic acid to reduce the pH of the liquid composition to slightly below the alkaline pH range to stabilize the drug and to enable the drug and lactate salt to be given as a mixture.

MARVIN RUSSELL THOMPSON.

REFERENCES CITED

The following references are of record in the file of this patent:

Article by Rohr in Surgery, Gynecology & Obstetrics, May 1944, pages 515–519.

"Modern Drug Encyclopedia," Gutman, 3rd ed. (1946), pages 328 and 787.

"New Modern Drugs," July 1946, pages 139 and 150; April 1947, page 360.

Article by Lehr, Proc. Soc. Exptl. Biol. & Med., Jan. 1945, pages 11–14.

Manufacturing Chemist, Feb. 1947, page 85.

J. Amer. Medical Assoc., Aug. 21, 1943, pages 1160 to 1165.